UNITED STATES PATENT OFFICE.

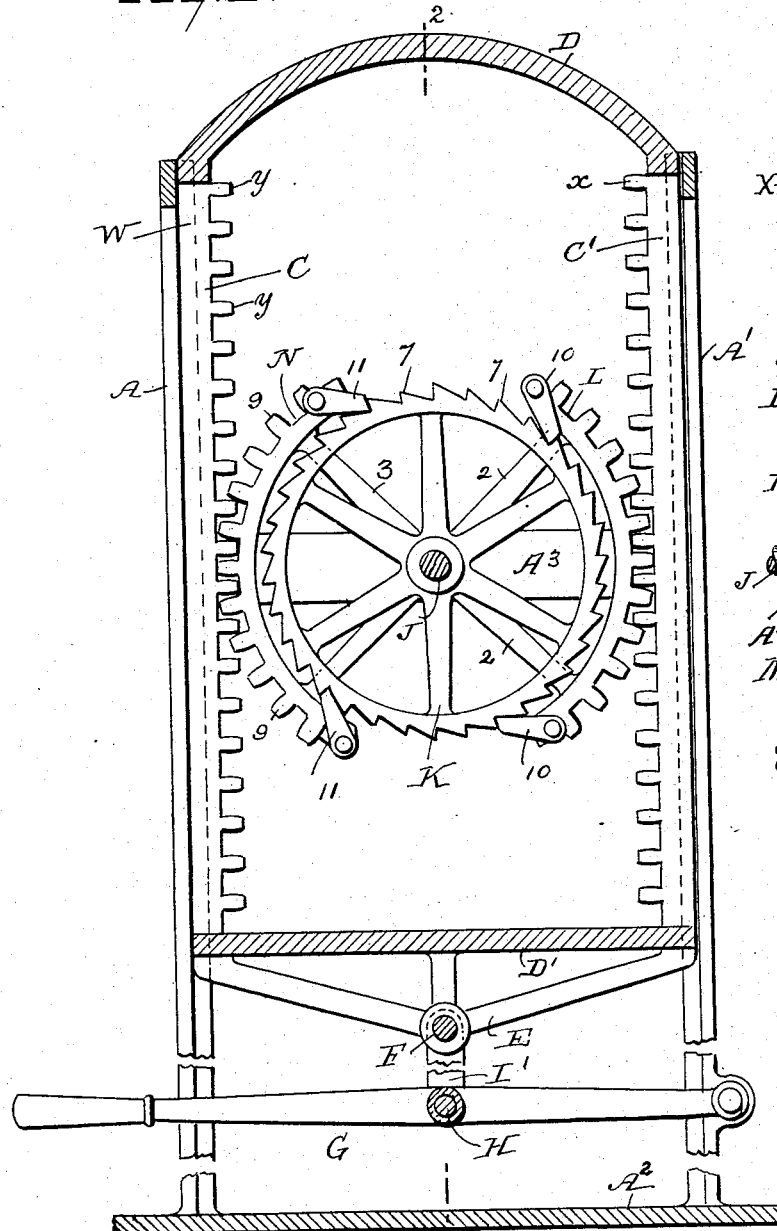
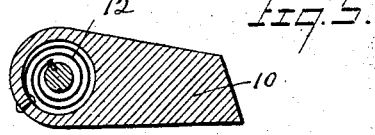

LORIN E. ALLEN, OF ENDICOTT, NEW YORK.

POWER-TRANSMISSION DEVICE.

1,171,763.  Specification of Letters Patent.  Patented Feb. 15, 1916.

Application filed February 6, 1913. Serial No. 746,659.

*To all whom it may concern:*

Be it known that I, LORIN E. ALLEN, a citizen of the United States, residing at Endicott, in the county of Broome and State of New York, have invented certain new and useful Improvements in Power-Transmission Devices, of which the following is a specification.

My invention relates to an improvement in power transmission by converting a reciprocating motion into a rotary motion.

A practical embodiment of my invention is herein shown and described as applied to constant leverage movement for the turning of a shaft.

I attain the object by the mechanism illustrated in the accompanying drawings, in which—

Figure 1 is a longitudinal section of my device taken on line 1—1 of Fig. 2. Fig. 2 is a cross section taken on line 2—2 of Fig. 1 and Fig. 3 is a sectional detail view of a part of my invention.

The same reference characters denote like parts in each of the several figures of the drawing.

In carrying out my invention I provide a guide frame consisting of the side standards A and A' rigidly mounted on a bed plate A². Slidably and vertically mounted upon and between said standards A and A' I have the rack rail W, consisting of the side pieces C and C', the upper cross piece D and the lower cross piece D'. On the side pieces C and C' are mounted a double series of gear teeth parallel to each other, $x$, $x$, $x$, etc., and $x'$, $x'$, $x'$, etc., and $y$, $y$, $y$, etc., and $y'$, $y'$, $y'$, etc., and below the cross piece D' is a support E, having the axis F. Pivotally mounted in side support A' is the hand lever G pivoted at H and linked to the axis F by links I, I'. Between side supports A and A' and journaled in cross bars A³ I have a shaft J on which is rigidly mounted a ratchet wheel K having in its rim the teeth 7, 7, 7, etc. On either side of said wheel K, and loosely mounted on shaft J, I have the pair of arcs or segmental gears L, supported on the hubs M and meshing with the double set of teeth on side pieces C'. Opposite to the pivoted arcs L, supported on the same hubs M by spokes 3, I have the parallel arcs N, one on each side of wheel K, having mounted in the rims of said arcs the cogs 9.

Pivotally mounted in arcs L at both their upper and lower ends, I have the dogs 10, adapted to contact with the notches 7, 7, 7, etc., on wheel K. Pivotally mounted in arcs N I have the dogs 11, adapted to contact with said notches 7, 7, 7, as before stated. The cogs 8, 8, 8 mesh in with the cogs $x$ and the cogs 9 mesh in with the cogs $y$.

In operation, in order to produce a transmission of power, I pull up on lever G, which raises frame D causing the arcs N to turn the dogs 11 engaging the notches 7, 7, 7, etc., which causes the wheel K to turn. The arcs L also turn, but the dogs 10, slip over the notches 7, 7, 7. When the arcs N have turned the wheel, being moved to their full limit, the lever G is moved downward and the arcs L turn downward the dogs 10, contacting with the notches 7, 7, 7, pushing the wheel K around, while the dogs 11 slip over the notches 7, 7, 7. Thus the arcs N are moved downward ready to move the load at the next upper movement of the lever, and thus the wheel K on shaft J is constantly turned around, and so the rotation of wheel K is continuous by means of the reciprocating movement of the rack frame C C'. The dogs or pawls 10, etc., are kept in contact with the ratchet wheel K by means of coil springs 12, as clearly shown in Fig. 3.

Having thus described my invention, what I claim as new and for which I desire Letters Patent is as follows:

1. In a device for the transmission of power, frame supports, a frame slidably mounted with said supports and provided with two parallel series of racks, each series being mounted on the inner side of said frame and opposite to the other series, a shaft extending through said frame, a notched wheel mounted rigidly on said shaft, two parallel segments supported on said shaft and disposed on each side of said wheel, said segments being provided with cogs meshing with the racks on the frame, dogs pivotally mounted on said segments and adapted to engage the notches on the wheel and means pivotally mounted on said support to move the frame back and forth.

2. In a device of the character described, a suitable supporting frame, a rack frame mounted for reciprocation within said supporting frame, said rack frame being provided with two parallel series of racks oppositely disposed, a shaft disposed transversely of the rack frame, a ratchet wheel keyed to said shaft, gear segments loosely mounted on said shaft and in engagement with the racks, spring controlled dogs carried by the segments for engagement with the ratchet wheel and means for reciprocating the rack frame.

3. In a device of the character described a suitable supporting frame, an open rack frame mounted for reciprocation within said supporting frame and provided with opposing racks, a driven shaft, a ratchet wheel within the rack frame keyed to said shaft, gear segments in mesh with the racks and loosely mounted on said shaft, spring controlled dogs carried by the segments and means for reciprocating the rack frame.

4. In a device of the character described a suitable supporting frame, a rack frame mounted for reciprocation within said supporting frame, said rack frame being provided at each end with a series of racks, the racks of each series being spaced from each other and disposed opposite to the corresponding racks of the other series, a driven shaft transversely disposed with reference to the rack frame, a ratchet wheel keyed to said shaft and disposed midway between the opposing series of racks, a series of segmental gears in mesh with the racks on one side of the frame, a second series of segmental gears in mesh with the racks at the other side of said frame, said segmental gears being loosely mounted on said shaft, a plurality of dogs carried by the segmental gears for engagement with the ratchet wheel and reciprocating means for the rack frame.

In testimony whereof I have affixed my signature in presence of two witnesses.

LORIN E. ALLEN.

Witnesses:
S. A. VALENTINE,
A. M. SNYDER.

Copies of this patent may be obtained for five cents each, by addressing the "Commissioner of Patents, Washington, D. C."